Figure 1:
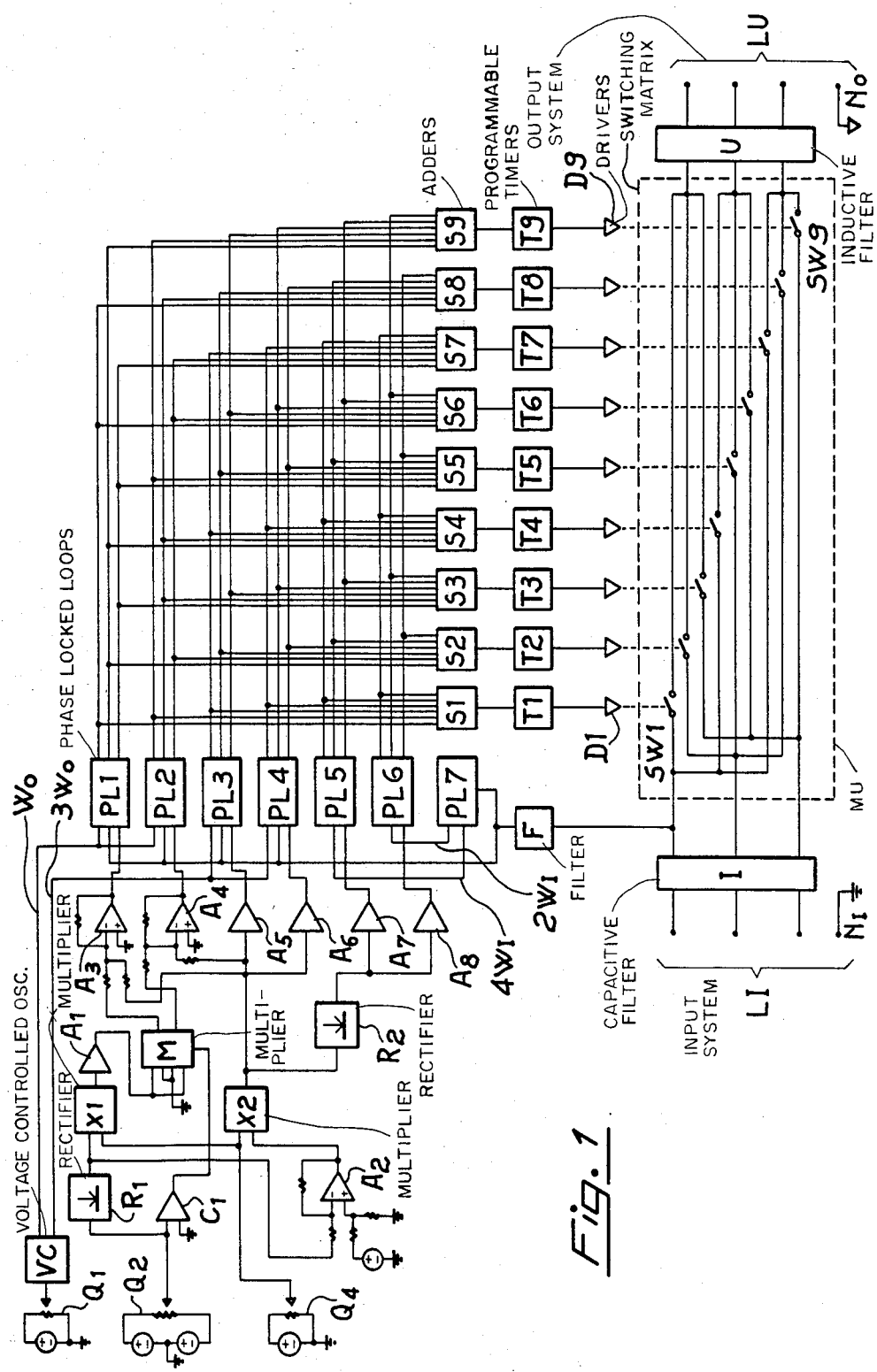

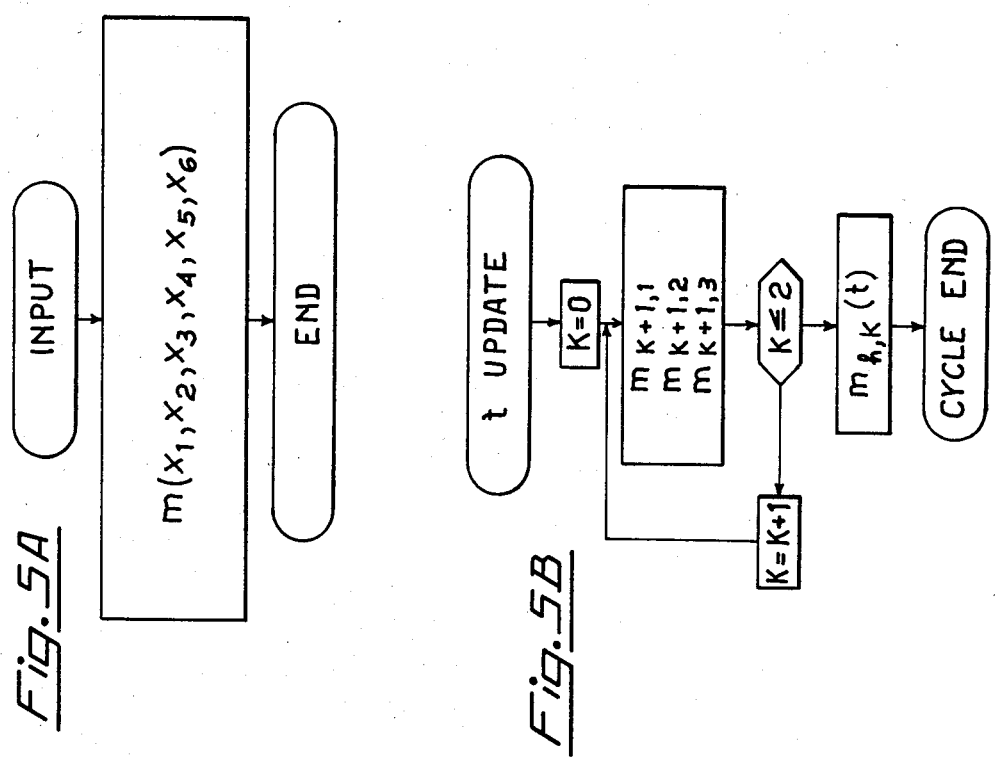
Fig. 5A
Fig. 5B
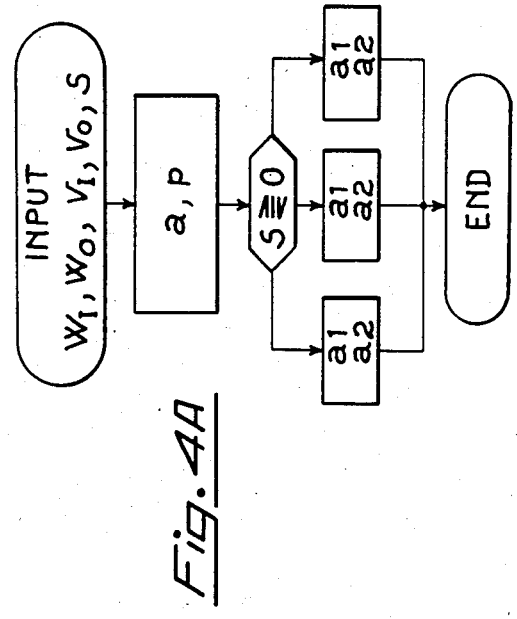
Fig. 4A
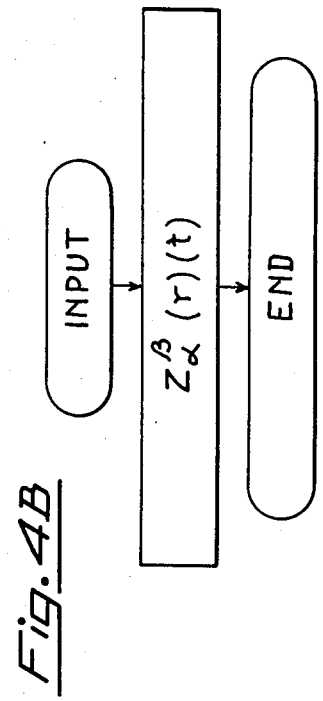
Fig. 4B

METHOD AND APPARATUS FOR THE CONVERSION OF A POLYPHASE VOLTAGE SYSTEM

The present invention relates to a direct AC-AC frequency converter, i.e. a converter of electric energy able to convert a polyphase AC input supply into an equivalent polyphase AC (or possibly DC) output system with frequency, amplitude and phase independently controllable, without any intermediate conversion step through a DC system.

Many applications require a power supply with a frequency and an amplitude that are different from those available, such as the variable speed drive of induction or synchronous motors, by adjusting simultaneously both the frequency and the amplitude of the supply system, the constant frequency, variable speed generators (VSCF), whereby the variable frequency energy produced by the prime mover (typically an airplane turbine) is converted to constant frequency before use, etc. As a general rule, the use of higher than line, controlled frequency allows important advantages in the design of almost all electric machines.

By adjusting the phase angle of the energy flowing through the converter, an important optimization of the load on the supply network is also possible.

The most desirable features of a frequency converter can be listed as follows:

(1) Continuous control of output frequency and amplitude;
(2) Sinusoidal input and output waveforms. In particular, subharmonics or harmonics near to the selected frequency must be minimized. Actually, any inductive load, having a low impedance at low frequency, acts as a subharmonic amplifier and would distort the current waveforms considerably.
(3) Bidirectional energy flow (to allow for generators, braking motors, etc.);
(4) Minimal use of reactive and dissipative elements, whose integration and scaling is impossible and whose impact on the converter cost is therefore destined to be predominant;
(5) Maximum utilization of semicondutor technology;
(6) Control of the input phase angle independently from the output phase angle.

Several types of frequency converters are known, which, for different reasons, do not fully provide the desirable features listed above. In general, existing frequency converters can be grouped into two categories: AC-DC-AC converters and direct converters.

The converters of the former type consist of two stages; in the first, the AC input is converted into an intermediate DC bus, which is in turn converted by the second stage into an output AC system with the desired properties. Among the most common drawbacks of this type of machines are the generally unidirectional energy flow, the need for large reactive elements in the intermediate filter, and non-sinusoidal waveforms.

Direct converters, on the other hand, synthetize the AC output directly out of the AC input without any intermediate stage. They consist of a number of switches connecting the input phases with the output phases in different combinations and of various types of filters. The best known converter of this type are the cycloconverter, the UFC (Universal Frequency Changer) and SFC (Slow Frequency Changer) and the HSFC (High Speed Frequency Changer) disclosed by the first inventor in the U.S. Pat. No. 4,468,725.

More in detail in the first three converter quoted the output waveform is a piece-wise approximation of the desired sinusoid obtained by sampling the input phases once per input cycle, by means of a matrix of switches, and according to different control methods. Consequently, the quality of the output waveform can only be improved by increasing the number of the input phases, and of the switches, with obvious cost penalities.

On the other hand, the HFSC synthetizes the output waveforms by sequentially connecting all the input phases to any given output phase, at frequency substantially higher than both the input and the set output frequency, and by modulating the sampling time of each input phase proportionally to a suitable combination of two sinusoids, where such sinusoids have a frequency which is proportional to the sum of and to the difference between the set output frequency and the input frequency. Therefore the output waveforms, and symmetrically the input waveforms, consist of a sinusoidal low frequency component, as measured with respect to the input neutral conductor, whose amplitude, frequency and phase are independently controllable, and of a cluster of high frequency harmonics, centered around and above the sampling frequency, and therefore easy to be filtered if necessary.

The input current is also sinusoidal and the relevant phase displacement is controllable but subject to the limitation that the absolute value of the input phase angle is less than or equal to the output phase angle.

Since waveform control is obtained by high frequency averaging, a single switch matrix is required, consisting of $n \times m$ switches, wherein n is the number of input phases and m is the number of output phases. The quality of the output waveform can be improved just by increasing the sampling frequency.

The HSFC allows for a continuous and independent control of frequency, amplitude and phase; however, the output amplitude is intrinsecally limited to 0.5 times the input amplitude. As the switch matrix must be designed to withstand the full input voltage, this feature implies a non optimal use of the power semiconductors in the matrix.

It is an object of the present invention to realize a direct converter which, while retaining the waveform control features typical of the HSFC, would not be subject to the said amplitude limitation, thus allowing optimal use of power semiconductors.

It is another object of the present invention to realize an AC direct converter in which the phase angle of the input current is controllable without the above limitation.

A further object of the invention is to realize a method for converting a polyphase balanced system into another one, more particularly a three phase system into a three phase system having different amplitude, frequency and/or phase angle.

The invention consists of a direct AC converter including input phase conductors and a neutral conductor for a balanced polyphase AC input voltage system, a plurality of output phase conductors and a neutral conductor for a polyphase AC output voltage system having at least one characteristic such as frequency, amplitude, phase angle or phase displacement which is different from that of the input voltage system, the input and output neutral conductors being unconnected between them, characterized by the fact that all the output phase $$V_{Oav} = V_{I1}(t)m_{11}(t) + V_{I2}(t)m_{12}(t) + V_{I3}(t)m_{13}(t).$$

Consequently, if the above duty cycles $m_{1h}(t)$ are modulated in a way to obtain a predetermined function $V_{Oav}(t)$, typically sinusoidal, at frequency substantially lower than $f_c$, the resulting actual output waveform Fourier spectrum consists of a low frequency component approximately equal to $V_{Oav}(t)$ and of a cluster of undesired harmonics at frequencies comparable or higher than $f_c$.

Figure 2:
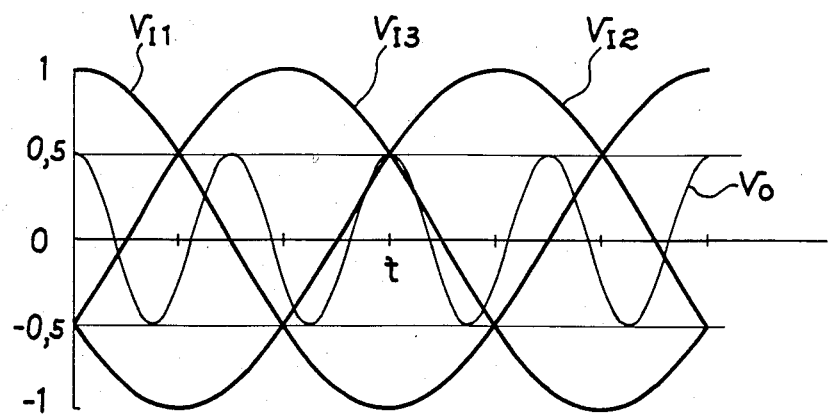

Since such high frequency harmonics are usually acceptable and can anyway be filtered away fairly easily, the general method summarily described so far allows for the realization of a frequency converter, subject to the only limitation that output voltage $V_{Oav}(t)$ cannot, at any time, exceed the range of the input voltage system. In fact, and with reference to the three phase system of waveforms shown in FIG. 2, there is a time t in which the maximum positive voltage available is only ½ of input peak voltage. Hence the amplitude limitation of the HSFC converter that the output amplitude is lower or equal to ½ of the input amplitude.

According to the present invention, such limitation is overcome in view of the fact that the neutral conductor $N_O$ of the output system must not necessarily be connected to the one $N_I$ of the input system. Consequently, it is no longer requested that outputs are sinusoidal with respect to the input system, as in the HSFC. The only condition to be met by the output waveforms is actually that the phase to phase voltages, i.e. the differences between any two output voltages, be sinusoidal and balanced.

In particular, according to the invention, the output waveforms amplitudes as referenced to the input neutral conductor, are the following:

$$\begin{aligned}
V_{O1}(t) &= v_O\cos(w_O t) - p\frac{\sqrt{3}}{12} v_I\cos(3w_O t) + p\frac{1}{4} v_I\cos(3w_I t) \\
V_{O2}(t) &= v_O\cos\left(w_O t + \frac{2}{3}\pi\right) - p\frac{\sqrt{3}}{12} v_I\cos(3w_O t) + p\frac{1}{4} v_I\cos(3w_I t) \\
V_{O3}(t) &= v_O\cos\left(w_O t + \frac{4}{3}\pi\right) - p\frac{\sqrt{3}}{12} v_I\cos(3w_O t) + p\frac{1}{4} v_I\cos(3w_I t)
\end{aligned} \quad (1)$$

p being a parameter that will be defined later and comprised between zero and one.

These waveforms represent a sinusoidal, balanced output system since the phase to phase output voltages are:

$$\begin{aligned}
V_{O12}(t) &= \sqrt{3}\, v_O\cos\left(w_O t - \frac{\pi}{6}\right) \\
V_{O23}(t) &= \sqrt{3}\, v_O\cos\left(w_O t + \frac{\pi}{2}\right) \\
V_{O31}(t) &= \sqrt{3}\, v_O\cos\left(w_O t + \frac{7}{6}\pi\right)
\end{aligned} \quad (2)$$

i.e. they are sinusoidal and with the correct phase relationships.

Contrarily to the situation of the HSFC converter wherein the synthesized waveforms are proportional to the first term only of the relationships (1), the waveforms represented in (1) allow for maximizing the output phase to phase voltages (2) without exceeding the fundamental limitation of this type of converter, with respect to the range of the input voltages.

Figure 3:
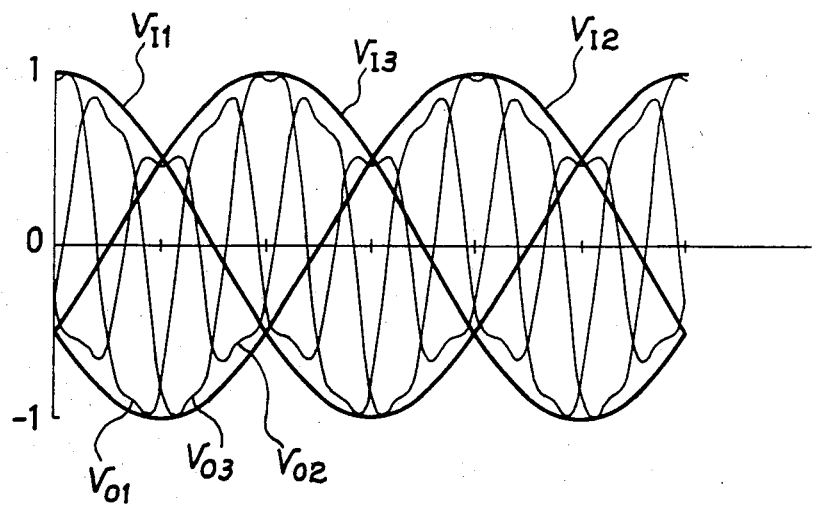

Namely, with reference to FIG. 3, one can note that when in the (1) p is set equal to 1 and $v_O$ equal to $\sqrt{3}/2$ the waveforms (1) never exceed the range of the three input voltages, although they represent a three phase voltage system wherein the output phase to phase amplitude is $\sqrt{3}/2$ the input amplitude, i.e. considerably higher if compared with the ½ limit of the prior art.

With reference to the relations (1) it can be noted that anyone of the output voltages (e.g. $V_{O1}$) as measured between the corresponding phase conductor and the input neutral conductor, comprises the usual component at the desired output frequency ($v_O\cos(w_O t)$) with the proper phase angle, and a common term given by $$-p\frac{\sqrt{3}}{12} v_I\cos(3w_O t) + p\frac{1}{4} v_I\cos(3w_I t)$$

which is identical for each phase. This term is formed as a linear combination of two sinusoidal waveforms, the first one at a frequency that is three times the output frequency, and the second one at a frequency that is three times the input frequency.

In the general case of an n phase input system and an m phase output system, the common term will be a linear combination of two sinusoidal waveforms, one having a frequency which is m times the output frequency, and the other having a frequency which is n times the input frequency.

The converter of the present invention is therefore capable of synthetizing waveforms of the type represented in (1). Such waveforms are synthesized as follows:

Let $w_I$, $v_I$, $s_O$ be the input pulsation, amplitude and output load phase angle, respectively;

Let $w_O$, $v_O$, $s_I$ be the desired output pulsation and amplitude and the desired input phase angle respectively;

Let $Z_\alpha{}^\beta(\gamma)$ be a function of time defined as:

$$Z_\alpha{}^\beta(\gamma)(t) = \cos\left((\alpha w_O + \beta w_I)t + \gamma\frac{\pi}{3}\right) \quad (3)$$

Let $$V_{I,h}(t) = v_I Z_0{}^1(2(h-1)) \quad h = 1, 2, 3; \quad (4)$$

and $$C_{O,k}(t) = c_O Z_1{}^0\left(2(k-1) + s_O\frac{3}{\pi}\right) \quad k = 1, 2, 3; \quad (5)$$

represent the instantaneous input voltages and load driven output currents, respectively;

Let M(t) be a matrix in which its elements $m_{k,h}(t)$ represent the duty cycle of the switch connecting the input line h with the output line k;

Define the function of time:

$$m(x_1,x_2,x_3,x_4,x_5,x_6) = \frac{1}{3}\left\{1 + \frac{\sqrt{3}}{2} p\left[Z_1^{-1}(x_1) + \right.\right.$$

$$Z_1^{-1}(x_2) - \frac{1}{6} Z_3^{-1}(x_3) + -\frac{1}{6} Z_3^{-1}(x_4) +$$

$$\left. sgn(p)\left[-\frac{1}{6\sqrt{3}} Z_0^4(x_5) + \frac{7}{6\sqrt{3}} Z_0^2(x_6)\right]\right] +$$

$$\left. a_1 Z_1^1(x_1) + a_2 Z^{1-1}(x_2) \right\}$$

(6)

where:

$$S = tg(s_I)/tg(s_O) \quad (7)$$

$$a = 2|S| \, v_O/v_I \quad (8)$$

$$p = (2v_O/v_I - a)/\sqrt{3} \quad (9)$$

$$\begin{aligned} a_1 = a; \, a_2 = 0 \quad \text{for } S < 0 \\ a_1 = a_2 = 0 \quad \text{for } S = 0 \\ a_1 = 0; \, a_2 = a \quad \text{for } S > 0 \end{aligned} \quad (10)$$

Then, if the nine switches SW1 ... SW9 (FIG. 1) are driven so that:

$$M(t) = \begin{bmatrix} m(0,0,0,0,0,0) & m(2,4,2,4,2,4) & m(4,2,4,2,4,2) \\ m(2,2,0,0,0,0) & m(4,0,2,4,2,4) & m(0,4,4,2,4,2) \\ m(4,4,0,0,0,0) & m(0,2,2,4,2,4) & m(2,0,4,2,4,2) \end{bmatrix} \quad (11)$$

the low frequency portion of output voltage waveforms $V_{O,k}(t)$, k=1,2,3 and input current $C_{I,h}(t)$, h=1,2,3 are approximately represented by:

$$V_{O,k}(t) = v_O Z_1^0(2(k-1)) + p\left[-\frac{\sqrt{3}}{12} v_I Z_3^0(0) + \frac{1}{4} v_I Z_0^3(0)\right] \quad (12)$$

$$c_{I,h}(t) = c_I Z_0^1\left((2(h-1)) + s_I\frac{3}{\pi}\right) \quad c_I = \frac{c_O v_O \cos(s_O)}{v_I \cos(s_I)} \quad (13)$$

Otherwise stated, each of the element $m_{k,h}(t)$ representing the duty cycle of the corresponding switch SW, is formed by a linear combination of six sinusoidal terms (as given by relationship (3)).

The so controlled converter is able to synthetize, on each output conductor, a voltage waveform which, as measured with respect to the input neutral conductor, is expressed by the (1). Relationship (12) represents anyone of the three voltages of relationship (1) when using the compact notation given by (3). Relationship (13) represents, with the same notation, the input current of phase h.

It is further to be pointed out that contrarily to the cited prior art, the ratio S between the trigonometrical tangents of the input and output phase displacements can be greater than 1 since this does not lead to values of the duty cycle, as expressed by $m_{k,h}(t)$, that are either negative or higher than 1. Therefore the controllable range of the input-output phase displacement is greatly enlarged.

A non-limiting embodiment of the control circuit capable of generating drive signals according to (6) ... (11) is now described with reference to FIG. 1. Said control circuit converts the input control variables such as desired output frequency, amplitude and ratio between tangents of input and output phase displacement, into the appropriate drive signals for the power switches in MU.

For the described embodiment providing for a three phase system both in input and output, the control circuit in its simplest form has four input control lines and nine output control lines. The input control signals are the desired ratio between the output and input voltages $v_O/v_I$, the desired ratio $tg(s_I)/tg(s_O)$, the desired output frequency and the actual input frequency; the output control signals are the drive pulses for the matrix MU.

Said control circuit can be either an analog one (FIG. 1) or a digital one (FIGS. 4A, 4B, 5A, 5B).

The operation of the analog control circuit is now described.

The output frequency is set through the circuit Q1 comprising a voltage source and a potentiometer. A voltage controlled oscillator VC converts said voltage into an AC voltage having the frequency equal to the desired one ($w_O$) and an AC voltage having a frequency which is three times the former ($3w_O$). The input frequency is sensed on LI, shaped and squared by filter F. With this signal, the phase locked loop PL7 generates two synchronous AC voltages with frequency two and four times the input frequency ($2w_I$ and $4w_I$).

The outputs of phase locked loops PL1 ... PL6 are three phase, sinusoidal with controllable amplitude, and can be synchronized on the sum or the difference of two input frequencies. By connecting the five mentioned AC signals ($w_O$, $3w_O$, $w_I$, $2w_I$ and $4w_I$) to the inputs of the PL's, all of the sinusoidal components of M(t) can be obtained.

The desired ratio between input and output phase displacements, $S=tg(s_I)/tg(s_O)$ is set by the circuit Q2 comprising two voltage sources and a potentiometer. This ratio can be negative and is not restricted in principle. The so obtained signal proportional to S is fed to a comparator C1 and a rectifier R1. The output from R1 is therefore proportional to $|S|$.

The desired ratio $v_O/v_I$ between output amplitude and input amplitude is set by circuit Q4 comprising a voltage source and a potentiometer. The network comprising X1 and A1, a multiplier and an amplifier respectively, result in a signal proportional to a according to (8), while adder/amplifier A2 together with multiplier X2 provide a signal proportional to p according to (9).

This signal is fed to amplifiers A5, A6 to control the amplitudes of PL3, PL4, while its absolute value, obtained by rectifier R2, is used to control the amplitude of PL5 and PL6 through amplifiers A7, A8. The voltage gains of A5 ... A8 are proportional to $$-\frac{\sqrt{3}}{12}, -\frac{\sqrt{3}}{12}, -\frac{1}{12}, +\frac{7}{12}$$

respectively, so that the output signals from PL3 ... PL6 are proportional to (6).

Moreover signal a and the value zero are fed to multiplexer M in direct and reverse sequence, M being controlled by C1 so that signals $a_1$, $a_2$ according to (10) are available on the multiplexed outputs of M. Such outputs are fed to adders A3, A4 together with signal p and the resulting outputs control PL1, PL2 amplitudes according to (6).

The eighteen signals provided by PL1 ... PL6 are proportional to the sinusoidal components which form the duty cycle coefficients $m_{k,h}(t)$ according to (6) ... (11). These signals are combined, in the correct order, by adders S1 ... S9 which output signals, proportional to $m_{k,h}(t)$ as given by (11), also providing the fixed offset required by (6). Such outputs are converted into drive pulses by programmable timers T1 ... T9 whose output pulse durations are proportional to the amplitude fed at the programming input.

To obtain the required sequential operation, the timers are connected in rings of three units, where each group is connected to a single output line, in such a way that the end of each timer cycle would trigger the start of the next timer. By this arrangement, the condition that only one input conductor is connected at any given output conductor in any given time is fulfilled and overload on the switches is avoided.

Timer outputs are decoupled and amplified by driver circuits D1 ... D9 which drive the power switches SW1 ... SW9 in the power switch matrix.

The converter can be completed by optional input and output filters I and U, capacitive and inductive respectively, which may be required with high impedance supply or with non-inductive loads.

An alternative embodiment of the control circuit based on a programmed digital circuit, is summarily described in the following. Reference is made to FIGS. 4A, 4B, 5A, 5B.

In this type of embodiment, a digital processor is used to compute and evaluate the numerical values of matrix (11) at regular intervals, much shorter anyway than the duration of both input and output cycles. For example, in an application where both input and output frequencies are below 100 Hz, the matrix M(t) can be evaluated once every millisecond.

The program of the processor consists of an initialization routine (FIG. 4A) which upon processor start up or on interrupt whenever the control parameters are changed, inputs the values of $w_I$, $w_O$, $v_I$, $v_O$, S and evaluates constants $a_1$, $a_2$, p according to (8) (9) (10). Two subroutines (FIGS. 4B, 5A) can be defined to simplify the main program. The first one (FIG. 4B) generates the function $Z_{\alpha\beta}(\gamma)(t)$ as defined by (3) whereas the second one (FIG. 5A) generates function $m(x_1, \ldots, x_6)$ as defined by (6). After the execution the control is returned to the main program.

In each evaluation cycle, (FIG. 5B), the processor timer updates the time register t, and evaluates M(t) with the mentioned subroutines. The nine numbers thus obtained are then fed to digital to time duration converters or down counters, which drive in sequence, through driver circuits, the nine power switches in MU as described before.

The power switches which form MU can be realized in many already known ways, for example as described in the cited U.S. Patent, or with newer components such as bidirectional power MOSFETs or COMFETs.

Although the invention has been described with reference to particular embodiments, the same is not limited to these, as all variants or modifications that will be evident to the one skilled of the art, such as the extension to polyphase systems, or a different program or design of the control circuit, or the suspension of phase displacement control with consequent reduction of complexity of (6) ... (11) and of the control circuit, are also part of it.

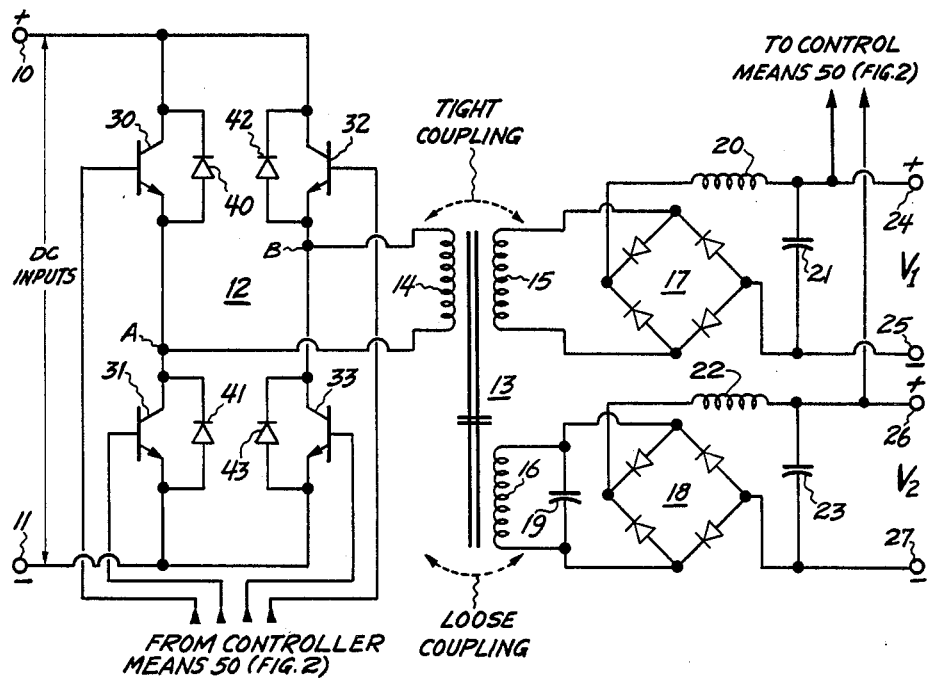

We claim:

1. A direct AC converter including input phase conductors and a neutral conductor for a balanced polyphase AC input voltage system, a plurality of output phase conductors and a neutral conductor for a polyphase AC output voltage system having at least one characteristic such as frequency, amplitude, phase angle or phase displacement between voltage and current which is different from that of the input voltage system, the input and output neutral conductors being unconnected between them, a plurality of electronic switch means for individually connecting each input phase conductor to each output phase conductor, means for generating control signals to cyclically operate said electronic switch means at a repetition rate substantially higher than the frequency of both the input and the output voltage systems, in a way to connect to each output phase conductor respectively only one input phase conductor at a time, and to connect all said input phase conductors to each one output phase conductor a plurality of times during any cycle of said input system or of said output system adjusting the switch means connection times in such a way that all the output phase voltages as measured with respect to the input neutral conductor comprise a common term which is a linear combination of two sinusoidal waveforms, the first one having a frequency equal to the input frequency multiplied by the number of phase conductors of the input system, and the second one having a frequency equal to the output frequency multiplied by the number of phase conductors of the output system, whereby the amplitude of the voltage as measured between any two of the output phase conductors is rendered maximum while at the same time each output voltage as measured between any output phase conductor and the input neutral conductor does not exceed at any time the amplitude of the input voltage at said time as measured between any input phase conductor and the input neutral conductor.

2. A converter as claimed in claim 1 characterized by the fact that both the input and output voltage systems are three phase systems and said common term is a linear combination of two sinusoidal waveforms having frequencies that are three times the input and output frequencies, respectively.

3. A method for directly converting a three phase input voltage system, balanced and sinusoidal, having input amplitude $v_I$, frequency $w_I/2$ and phase displacement between voltage and current $s_I$, into a three phase output voltage system, also balanced and sinusoidal, and having output voltage $v_O$, frequency $w_O/2$ and phase displacement between voltage and current $s_O$ wherein at least one of the latter quantities is different from the former, characterized by the fact that each output waveform is obtained by sequentially sampling all the input phases and that said sampling is carried out in such a way that the modulation coefficients $m_{k,h}(t)$, which are defined as the ratios between the time in which the input phase h is connected to the output phase k and the overall sampling period measured during the sampling period starting at the time t, with the values of k and h being 1, 2 or 3, are given by the elements of the following matrix (k being the row index, h being the column index):

$$M(t) = \begin{bmatrix} m(0,0,0,0,0,0) & m(2,4,2,4,2,4) & m(4,2,4,2,4,2) \\ m(2,2,0,0,0,0) & m(4,0,2,4,2,4) & m(0,4,4,2,4,2) \\ m(4,4,0,0,0,0) & m(0,2,2,4,2,4) & m(2,0,4,2,4,2) \end{bmatrix}$$

where each of the elements $m_{k,h}(t)$ is a function of the time t through the arguments $x_1$ to $x_6$ and is given by:

$$m(x_1,x_2,x_3,x_4,x_5,x_6) = \frac{1}{3}\left\{1 + \frac{\sqrt{3}}{2}p\left(Z_1^{1}(x_1) + Z_1^{-1}(x_2) - \frac{1}{6}Z_3^{1}(x_3) - \frac{1}{6}Z_3^{-1}(x_4) + \text{sgn}(p)\left(-\frac{1}{6\sqrt{3}}Z_0^{4}(x_5) + \frac{7}{6\sqrt{3}}Z_0^{2}(x_6)\right)\right) + a_1 Z_1^{1}(x_1) + a_2 Z_1^{-1}(x_2)\right\};$$

where $Z_\alpha^\beta(\gamma) = \cos\left((\alpha w_O + \beta w_I)t + \gamma\frac{\pi}{3}\right)$ is a trigonometric function of the time t and of the integer parameters $\alpha, \beta, \gamma$ which is representative of a linear combination of the input and output frequencies; where $$p = (2v_O/v_I - a)/\sqrt{3};$$

and sgn(p) is equal to +1 if p is a positive number and equal to −1 if p is negative;
where
a is a signal representative of the desired ratio between the output voltage amplitude and the input voltage amplitude, also depending on the absolute value of signal S, namely $a=2|S|v_O/v_I$;
where
S is a signal representative of the desired ratio between the input and output phase displacements and is given by the ratio between the trigonometric tangent of the input phase displacement and the trigonometric tangent of the output phase displacement, namely $$s = tg(s_I)/tg(s_O);$$

and where $a_1 = a$ and $a_2 = 0$ if $S < 0$
$a_1 = a_2 = 0$ if $S = 0$
$a_1 = 0$ and $a_2 = a$ if $S > 0$.

* * * * *

United States Patent [19]

Steigerwald

[11] Patent Number: 4,628,426
[45] Date of Patent: Dec. 9, 1986

[54] DUAL OUTPUT DC-DC CONVERTER WITH INDEPENDENTLY CONTROLLABLE OUTPUT VOLTAGES

[75] Inventor: Robert L. Steigerwald, Scotia, N.Y.

[73] Assignee: General Electric Company, Schenectady, N.Y.

[21] Appl. No.: 793,430

[22] Filed: Oct. 31, 1985

[51] Int. Cl.[4] .......................................... H02M 3/335
[52] U.S. Cl. ...................................... 363/17; 363/21; 363/26; 363/79; 363/98; 363/132; 363/134; 336/184
[58] Field of Search ....................... 363/17, 20, 21, 24, 363/25, 26, 79, 98, 131, 132, 133, 134, 28; 336/180, 182, 184

[56] References Cited

U.S. PATENT DOCUMENTS 4,353,113 10/1982 Billings .................................. 363/41
4,356,542 10/1982 Bruckner et al. ..................... 363/26

OTHER PUBLICATIONS

Kohno and Kuwabara, *Single-Ended DC-to-DC Converter with Two Individually Controlled Outputs,* Fujitsu Scientific and Tech. J. (Mar. 1980), 23-37.
Dauhajre and Middlebrook, *Simple PWM-FM Control for an Independently-Regulated Dual Output Converter,* Proceedings of Powercon 10 (Mar. 1983), 1-8.

*Primary Examiner*—Patrick R. Salce
*Assistant Examiner*—Anita M. Ault
*Attorney, Agent, or Firm*—Marvin Snyder; James C. Davis, Jr.

[57] ABSTRACT

A single DC power switching converter feeds two DC load circuits from two transformer secondary windings. One winding is tightly coupled to the primary and its output voltage is controlled using pulse-width modulation. The other secondary winding is loosely coupled to the primary so that its leakage inductance resonates with a secondary capacitor such that its output is controlled by converter frequency adjustment. Thus, both output voltages are controlled using a single power switching stage.

9 Claims, 8 Drawing Figures